April 11, 1961    D. L. FREEBAIRN, JR., ET AL    2,978,913
INTERNAL GIMBAL GYROSCOPE Filed Sept. 7, 1956    3 Sheets-Sheet 1

INVENTORS.
DARWIN L. FREEBAIRN, JR
JOSEPH S. ACTERMAN
BY

ATTORNEY

April 11, 1961  D. L. FREEBAIRN, JR., ET AL  2,978,913
INTERNAL GIMBAL GYROSCOPE Filed Sept. 7, 1956  3 Sheets-Sheet 2

INVENTORS.
DARWIN L. FREEBAIRN, JR.
JOSEPH S. ACTERMAN
BY
ATTORNEY

United States Patent Office 2,978,913
Patented Apr. 11, 1961

2,978,913

INTERNAL GIMBAL GYROSCOPE

Darwin L. Freebairn, Jr., Whittier, and Joseph S. Acterman, Long Beach, Calif., assignors to North American Aviation, Inc.

Filed Sept. 7, 1956, Ser. No. 608,509

7 Claims. (Cl. 74—5.7)

This invention relates to a gyroscope having an internal gimbal and more particularly, to a gyroscope having the accuracy required in inertial navigation systems.

Gyroscopes that are used for inertial navigation must have accuracy, in terms of lowness of drift rate, far exceeding that required in other applications. The reason for this is that in inertial navigation, gyroscope drift rate under certain circumstances gives rise to an average position error which is equal to the drift angle times the radius from the center of the earth to the craft. Thus, a drift rate of one minute or arc per hour may give a position error of one nautical mile. This problem is not present in gyroscope compasses and in flight instruments, such as gyroscopic artificial horizons and gyromagnetic compasses, where terrestrial references, that is, gravity or the earth's magnetic field, are employed to supervise the gyroscope. In a terrestrial referenced gyroscope, a drift rate may give rise to an error, but the error is non-cumulative. In flight instruments, a gyroscope drift rate of 10° per hour is ordinarily acceptable, but for inertial autonavigators, the drift rate must be no greater than 0.01 or 0.001° per hour.

Lack of symmetry of gyroscope configuration can be a serious source of error when drift rates of the order of a few thousandths of a degree per hour are under consideration. Geometrical asymmetry can give rise to shift of mass of the gyroscope on change of rotor speed, temperature or other variable, and even minute mass shifts are significant. The mass of the rotor acted upon by the acceleration of gravity can cause a prohibitive torque even when the moment arm is only a microinch or a part thereof.

Many symmetrical gyroscope constructions have been proposed in the past. Types using a floated spinning ball, with a single motor at the equator are almost ideal from the point of view of a geometrical symmetry but have some limitations, such as the difficulty of applying precision control torques to the ball. Further, the provision of a discoid rotor with the driving motor stator outside gives good symmetry but results in a gyroscope of undesirably small angular momentum for a given outer case diameter, i.e., low gyroscopic efficiency. Another type of gyroscope, in which the motor stator is completely surrounded by a hollow rotor, is good from the point of view of symmetry, but involves difficulty and uncertainty in setting and maintaining bearing preload as the motor stator is interposed between the two rotor spin bearings.

Gyroscopes have been made geometrically symmetrical about the center plane normal to the spin axis with a motor on each side of said plane. These have been found to be neither electrically nor thermally symmetrical when used with motors of the hysteresis synchronous type, generally preferred for navigation-type gyroscopes. In such an instrument, currents in the two motors are subject to fluctuations independent of each other and in an unpredictable manner. As a result, one side of the gyroscope may run slightly hotter than the other, upsetting the balance and giving rise to a gravity moment. Even when such a gyroscope is mounted with the output axis vertical so that the mass is not subject to gravity, error torques can occur by reason of interaction of leakage polyphase field current with the stationary case of the gyroscope. This occurs because of the proximity of the stator end turns to the stationary case. Disturbing torques from these effects are such as to produce drift rates of the order of only a few thousandths of a degree per hour. Such drift rates would be entirely negligible in a flight or fire control gyroscope, but they are by no means negligible in inertial navigator gyroscopes.

Another cause of drift in a gyroscope is structural flexibility which may be acted upon by the force of gravity, by vehicle acceleration forces, or by vibrational forces. The deleterious effects of flexibility are overcome by designing an isoelastic structure. The advantages of isoelasticity are described in U.S. Patent No. 2,649,808 to J. M. Slater, D. L. Freebairn, and R. M. Benson. The acceleration-dependent disturbing torque in the gyroscope is proportional to the net anisoelasticity, that is, a one microinch yield normal to the line of action of the acceleration vector will produce a given disturbing torque in a gyroscope regardless of the microinch yield in the direction of the acceleration vector. A rigid structure which resists all deflection is therefore as good as an isoelastic structure which yields, more or less, flexibly in the direction of the acceleration vector and resists deflection at right angles to it.

The above mentioned disadvantages of typical prior gyroscope constructions are overcome by the present invention which embodies a rigid, lightweight gimbal frame which is located within the casing, immediately surrounding the motor stator. A cross section of the gimbal frame in a plane containing the axis of rotation of the gyroscope may have typical girder type shapes, such as a T, I-beam, horizontal H, square, or other symmetrical polygon. The gimbal forms part of the gyroscope frame, and the core of the rotor is fitted to rotate within the annulus of the gimbal. A gimbal having cross sections, such as a T, I, or horizontal H, may be referred to as a web-gimbal because of the web located between the outer and inner peripheral members. The outer member may have various configurations, such as rectangular or annular, in a plane normal to the axis of rotation. The inner member would generally be a ring to conform with external periphery of the motor stator.

The internal gimbal, regardless of its shape, saves considerable weight over the conventional external and nonrigid types. The gimbal in the present invention is symmetrical about planes either normal to or containing the spin axis, and provides a good heat path outward from the motor to the shell.

It is therefore an object of this invention to provide an improved gyroscope.

It is a principal object of this invention to provide a gyroscope which is geometrically, thermally, and electrically symmetrical.

It is another object of this invention to provide a gyroscope having the gimbal structure extending within the shell in order to achieve great structural rigidity together with low weight, high gyroscopic efficiency, and having good heat conduction from a centrally located motor to the shell.

It is a further object of this invention to provide a gyroscope in which the motor is as far removed from the shell as possible to minimize magnetic torque.

It is a still further object of this invention to provide a gyroscope having two approximately hemispherical shells which are stiffened by being mounted on a rigid, lightweight gimbal frame located between them at their outside circumferences, and by the rigid conical attachment of the shells to a central shaft.

Other objects of this invention will become apparent from the following description taken in connection with the accompanying drawings, in which Fig. 1 is a cross sectional view of the present invention having a webbed girder type of gimbal frame;

Figure 1:
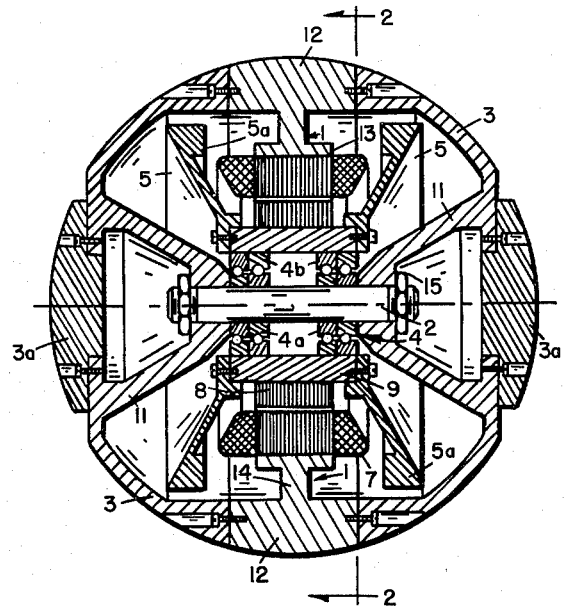

Referring to Fig. 1, stationary gyroscope shaft 2 is shown rigidly mounted in cones 11 of frame shells 3 which provide casing means. Shaft 2 is held in place by nuts 15 which may also serve to hold the gyroscope frame members together. Inner races 4a of ball bearings 4 are cemented to shaft 2 and are nonrotating. Outer races 4b are cemented to collar 9 and rotate therewith. Rotor core 8, typically of laminated electrical steel construction, is cemented to the outed circumference of collar 9. Truncated cone-shaped discs or fly wheels 5 are bolted at their truncated ends to the opposite sides of collar 9 which may be weighted according to the rigidity desired. Discs 5 have heavy masses 5a located at their rims and in the preferred embodiment, shown in Fig. 1, form a bifurcated or generally X-shaped inertia rotor. Another typical rotor which may be used is an H-shaped type, also symmetrical about the central plane normal to the spin axis. The latter is a satisfactory rotor, but is not as space-saving as the X-shaped type. Surrounding rotor core 8 is motor stator 7 which is cemented to inner flange or ring 13 of web gimbal 1. A good heat path is thus provided from the motor through the gimbal to the exterior of the shell. Cementing is a preferable way of securing the foregoing members together; however, other means may be used, such as press-fitted, bolted, or threaded engagements.

Gimbal 1 is shown to be of T-shaped cross section in any plane containing the axis of rotation of the gyroscope, and is composed of outer ring or flange 12, web 14 and inner ring 13. This configuration has the advantages of lightweight and great rigidity made possible by the web and its surrounding structure. The T-shaped web is considered preferable in the substantially spherical-shape gyroscope because it is more easily fitted interiorly of shells 3 by means of its longer member 12. By having inner ring 13 narrower than outer ring 12, additional weight saving is accomplished. However, it is easily seen that other configurations would be satisfactory and the descriptive names of such configurations are dependent upon the widths of the inner and outer flanges surrounding web 14.

Shells 3 are ordinarily approximately hemispherical and may be bolted to opposite ends of flange 12 to form a generally spherical gyroscope. Covers 3a may be bolted to shells 3 to form a seal therewith after shaft 2 is properly secured in cones 11.

Figure 2:
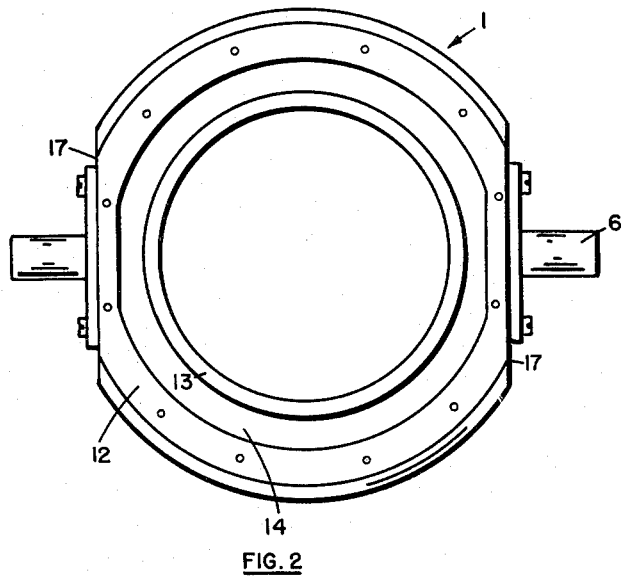
Fig. 2 is a view of the web gimbal alone taken along the line 2—2 of Fig. 1.

Referring to Fig. 2, a view is shown of web gimbal 1 taken along the line 2—2 of Fig. 1. Trunnions 6 may be bolted to flat portions 17 on flange 12 at the opposite ends of a diameter of gimbal 1. Portions 17 may be rounded to provide a more nearly perfect sphere depending upon design considerations. Lead-throughs, not shown, may be provided in one of the trunnions to serve as conduits for leads to conduct electricity to the motor stator or windings 7. The output axis bearings, also not shown, may be mounted on trunnions 6. Stiffening of gimbal 1, typically made of aluminum or magnesium, is obtained not only from the width and thickness of outer ring 12 and inner ring 13, but also from web 14. The web gimbal, thus provides great structural rigidity with minimum weight.

Figure 3:
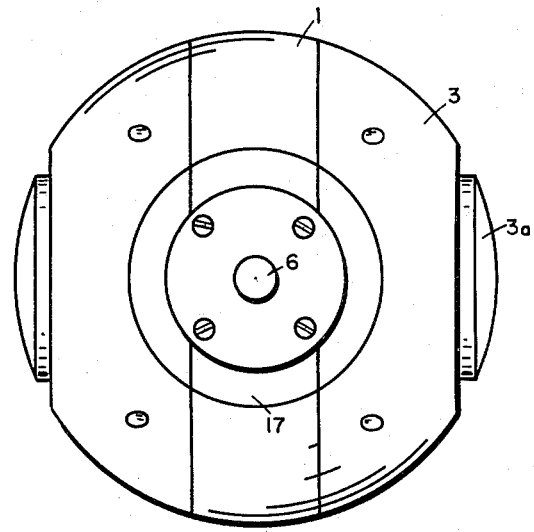
Fig. 3 is an external view of the gyroscope shown in Fig. 1, having an internal web gimbal.

In Fig. 3 is a view of the enclosed gyroscope, sealed for possible flotation, showing one trunnion 6 in plan view, secured to flat surface 17 of gimbal 1. Shells 3 are shown bolted to gimbal 1 and covers 3a are bolted to shells 3.

Figure 4:
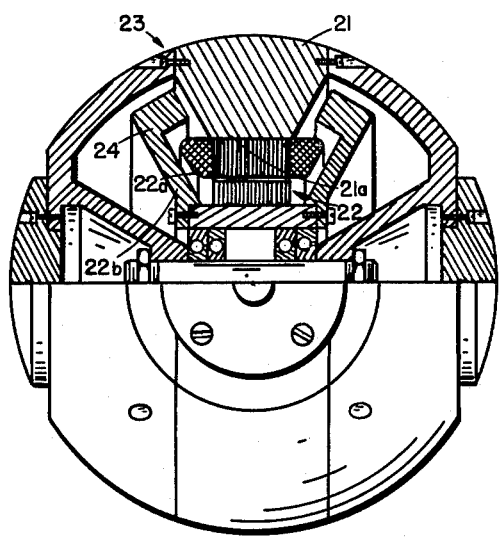
Fig. 4 is a fragmentary cross section of the present invention having an annular internal gimbal which provides an unusually good heat path.

Fig. 4 shows a fragmentary cross sectional view of the present invention in which the annular internal gimbal 21 has the cross section of a symmetrical five-sided figure. Gimbal 21 makes possible an extremely rigid gyroscope of lighter weight than one with an external gimbal. However, this embodiment is not as light as one with a web gimbal. The chief advantage of gimbal 21, or similar configurations, is the excellent heat path it provides from the centrally located motor 22 to the exterior of the casing 23. Stator 22a may be cemented to inner periphery 21a of gimbal 21. As described above, the rotor flywheels 22b extend radially outward from stator 22a and have the desirable masses 24 in the wheel rims.

Figure 5:
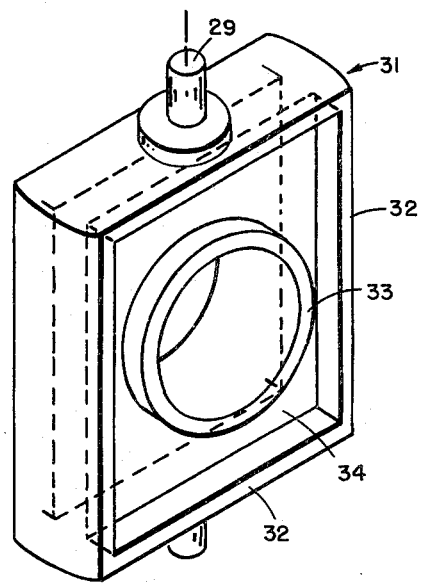
Fig. 5 is an isometric view of a substantially rectangular gimbal having an annular inner ring.

Fig. 5 shows a gimbal 31 having a rectangular periphery and which is especially desirable for enclosing in a cylindrical casing or in other nonspherical casings. Gimbal 31 may be lightened by cutting away portions between the outer flanges 32 and the inner ring 33, leaving web 34 connecting and supporting the inner ring and the outer flanges. Trunnions 29 may be bolted to opposite outer flanges. Here again, the motor stator may be secured to the inner periphery of ring 33. As can be seen, this embodiment of the invention provides a good heat path from the motor outward to the shell, and provides the desired rigidity, symmetry, and lightweight without reducing gyroscopic efficiency.

In the present invention, electrical and thermal symmetry are achieved in addition to geometrical symmetry. This is accomplished by providing, as shown in the drawings, a single motor symmetrical about the center plane normal to the spin axis. The motor is of stator-outside configuration in which high gyroscopic efficiency, expressed in ratio of angular momentum to weight and size, is retained by extending the rotor radially beyond the stator by means of the cone-shaped wheels. The latter is effected by a three piece rotor construction, two discs and a collar, in combination with the gimbal ring which lies partially within the outer rim of the rotor and to which the supporting structure for the rotor spin bearings is attached. Bearings 4 are typically of the close-coupled, outer-race-rotating type which have been proved to be very practical from the point of view of rigidity and ease of maintenance of preload.

The construction provided in the present invention is such as to yield all of the advantages of a single, central motor in addition to the advantages of an efficient gyroscope configuration. The double-cone or bifurcated rotor has a high gyroscopic efficiency because the mass is concentrated at the rims and because it is stiff, since the cones have heavy rims and a heavy central collar. The inset gimbal ring is extremely rigid and also serves as an efficient conductor of heat from the motor to the outside. Further, the motor is disposed as far as it can possibly be from the gyroscope case and the strong field of the rotor is shielded by the stator laminae, thus minimizing disturbance from the interaction of the fields with the case.

Although the invention has been described and illustrated in detail, it is to be clearly understood that the same is by way of illustration and example only and it is not to be taken by way of limitation, the spirit and scope of this invention being limited only by the terms of the appended claims.

We claim:

1. A gyroscope comprising a central shaft, a rotor bilaterally symmetrical about a plane normal to the axis of rotation; said rotor mounted for rotation on said shaft; said rotor having a centrally located electrical core, a gimbal having an outer ring, an inner ring and a web between and substantially at right angles to said rings, a motor stator secured on the inner periphery of said inner ring, said rotor core being surrounded by said motor stator; spherical casing means encasing said shaft, rotor and stator; said gimbal being mounted interiorly of said casing means, said casing means having inwardly directed truncated cones connected to and supporting said shaft, said rotor having bifurcated portions extending radially outward from said core, the periphery of said bifurcated portions having annular masses extending to a portion outside of said stator.

2. The invention according to claim 1 in which said bifurcated portions are truncated cones, and in which said masses are annular rings attached to the periphery of the bases of said last-mentioned cones.

3. A gyroscope comprising a central shaft, a rotor bilaterally symmetrical about a plane normal to the axis of rotation, said rotor having a centrally located rotor core, a motor stator surrounding said rotor core, spherical casing means encasing said shaft, rotor, and stator, said casing means having inwardly directed cones connected to support said shaft, said rotor having annular masses extending from each end thereof to a position peripherally outside of said stator, and an annular gimbal mounted interiorly of said casing means, said gimbal having an outer ring, an inner ring, and a web between and substantially at right angles to said rings, said stator being mounted on the inside periphery of said inner ring of said gimbal.

4. The invention according to claim 3 in which said masses are annular rings attached to truncated cones extending from said rotor.

5. The invention according to claim 4 in which said rotor is substantially X-shaped.

6. A gyroscope comprising a central shaft, a rotor bilaterally symmetrical about a plane normal to the axis of rotation, said rotor having a centrally located electrical core mounted for rotation on said shaft, a motor stator surrounding said rotor core, said rotor being bifurcated and extending radially outward from said core and being peripherally exterior of said stator; casing means encasing said shaft, rotor, and stator, said casing means having inwardly directed truncated cones connected to said shaft; and a gimbal mounted interiorly of said casing means, said stator being mounted on the inside periphery of said gimbal.

7. The invention according to claim 6 in which the peripheries of said bifurcated portions of said rotor have annular masses extending from each end thereof to a position peripherally outside of said stator.

References Cited in the file of this patent

UNITED STATES PATENTS

| 1,555,633 | Burch et al. | Sept. 29, 1925 |
| 2,378,858 | Mehan | June 19, 1945 |
| 2,649,808 | Slater et al. | Aug. 25, 1953 |
| 2,720,602 | Dolude | Oct. 11, 1955 |
| 2,786,357 | Quermann et al. | Mar. 26, 1957 |
| 2,857,534 | Beach | Oct. 21, 1958 |

FOREIGN PATENTS

| 473,048 | France | Sept. 5, 1914 |
| 971,418 | France | July 19, 1950 |
| 1,119,504 | France | Apr. 3, 1956 |